Aug. 11, 1970 J. M. BEVIS 3,523,655

TAPE TRANSPORT APPARATUS

Filed Sept. 15, 1967 3 Sheets-Sheet 1

INVENTOR.
JEFFREY M. BEVIS

BY
Julius L. Rubinstein
ATTORNEY

Aug. 11, 1970 J. M. BEVIS 3,523,655

TAPE TRANSPORT APPARATUS

Filed Sept. 15, 1967 3 Sheets-Sheet 2

INVENTOR.
JEFFREY M. BEVIS

BY Julius L. Rubinstein
ATTORNEY

INVENTOR.
JEFFREY M. BEVIS
BY Julius L. Rubinstein
ATTORNEY

United States Patent Office 3,523,655
Patented Aug. 11, 1970

3,523,655
TAPE TRANSPORT APPARATUS

Jeffrey M. Bevis, Long Beach, Calif., assignor to Chalco Engineering Corporation, Gardena, Calif.

Filed Sept. 15, 1967, Ser. No. 668,234
Int. Cl. B65h 59/38; G03b 1/04; G11b 15/32
U.S. Cl. 242—190 6 Claims

ABSTRACT OF THE DISCLOSURE

The tape handler constructed according to the principles of this invention comprise two large motor driven tape reels mounted on a support. A low inertia pivotally mounted take-up arm is associated with each reel and is also mounted on the support. The pivot shaft of each take-up arm drives a potentiometer which is a part of a circuit which controls the electric motor which drives each tape reel. Each take-up arm is provided with a plurality of tape idler spools both to provide a long tape path between the tape reader and the tape reels and to provide a mechanical connection between the take-up arms and the tape reels when the perforated tape extends between the tape reels and the take-up arms. The electric circuit associated with each potentiometer and motor provides a feedback which causes the tape reel to rotate in a direction which maintains a constant tension in the tape by restoring each take-up arm to a fixed angular or first neutral position whenever the take-up arm pivots in response to high speed tape accelerations and deceleration.

This invention relates to a tape handler, and more particularly to a tape handler designed for use in a high speed perforated tape reader.

BRIEF SUMMARY

The knob 38 of a cut-off switch (not shown) is mounted on the support in the path of the pivotally mounted take-up arms. In this way, whenever the tape is not properly threaded on the take-up arms or the tape supply becomes exhausted or the tape breaks, one of the take-up arms pivots and strikes the knob which shuts off power to the tape reader and the tape handler.

The electric circuit associated with each take-up arm and tape reel is provided with a means for introducing a signal into one of the circuits. This causes the take-up arm to pivot to a second fixed angular or second neutral position. In this second position the tension in the perforated tape is increased because the electric motor associated with the take-up arms rotates the tape reel in a direction to maintain this tension. Meanwhile the take-up arm on the other tape reel remains in the first neutral position, and the portion of the tape connecting that take-up arm and tape is at a lower tension. Consequently the perforated tape moves toward the tape reel exerting the greater tension to provide a high speed tape wind. The direction of tape wind can be reversed by providing a suitable signal which causes the take-up arm on the other reel to move to the second neutral position while the first described tape reel is in the first neutral position.

Perforated tape readers are designed to stop and start at frequencies up to several thousand times per second. This imposes severe design requirements on a tape handler, particularly when large quantities of perforated tape are to be stored on the tape reels. This is because the inertia of large masses of tape on the tape reel resists high speed tape accelerations and decelerations.

In addition, the tape handler must provide a high speed tape wind or rewind in either direction. Heretofore this was done by simply inserting a signal into a tape handler which caused the tape to wind on the reel at a high speed. But, this was objectionable because it frequently broke the tape. Alternatively, a constant torque motor could have been used to wind the tape, but this approach was too expensive.

In the present invention inertial problems caused by heavy masses of tape and large tape reels is overcome by employing a low inertia spring loaded pivotally mounted take-up arm with each tape reel. Each take-up arm is provided with two idler spools over which the tape passes en route to the tape reels. This provides a long tape path so that there is sufficient tape slack to accommodate high speed tape accelerations and decelerations. In addition, the passage of the tape over the idler spools on the low inertia take-up arms permits the take-up arms to pivot freely and quickly in response to high speed tape accelerations and decelerations. This pivoting action, which increases or decreases the tape path between the tape reader and the tape reels, permits the tape handlers to store, pay out, and take up long lengths of tape despite the high frequency stops and starts.

As stated above, in prior tape handlers, a motor was simply connected to the tape reels and when a signal was given, the tape reel rotated and wound up the tape at a very high speed without regard to the tension in the tape. However, it is advantageous to maintain a controlled tension in the tape in an environment where the tape is subjected to high speed stops and starts. If the tension in the tape is too low, the tape will fall off the pulleys and idler spools in the tape handler and the tape reel will wind the tape so loosely that the tape reel will not be able to hold enough tape. If the tape tension is too high, the tape may break. The strength of the tape varies because of the pattern of perforations disposed along the length of the tape.

In essence, the tape handler consists of two identical systems for storing, paying out, or taking up tape. The two tape reel systems establish a certain tension in the tape between them and maintain this tension while the tape is moved by the reader intermittently in either direction. In addition, the tape handler controls the tension in the tape while the tape is subjected to high speed tape wind or rewind. When the tape handler is controlled by the tape reader, each tape reel system acts as an infinite source or sink. In this mode of operation the tape handler is merely a follower which provides a supply of tape to the tape reader as required.

In the auxiliary or rewind mode, one of the tape systems of the tape handler attempts to maintain a greater tension on the tape than the other system. If tape movement is not constrained by the magnetic brakes in the tape reader, this disparity of forces causes the tape to move from one tape reel to the tape reel which maintains the greatest tension. During rapid rewind, the tension in the tape is controlled so that it is less than the tension required to tear the tape.

What is needed therefore, and comprises an important object of this invention, is a tape handler which can store, pay out, or take up long lengths of tape moving through a high speed perforated tape reader.

Another object of this invention is to provide a tape reader which can accommodate high speed accelerations and decelerations of the tape without tearing the tape.

A further object of this invention is to provide a tape handler which maintains a controlled tension on the tape as it follows the movement of the tape through the tape reader.

Still another object of this invention is to provide a tape reader which can wind or rewind the tape at high speeds in either direction with a controlled tape tension.

Yet, a further object of this invention is to provide a tape reader which can take over the functions of the capstan and pinch roller on the tape reader.

Still a further object of this invention is to provide a tape handler with an automatic power cut-off mechanism in case the tape is torn, or the supply becomes exhausted, or, in case the tape falls off the idler spools and rollers.

These and other objects of this invention will become more apparent when better understood in the light of the accompanying drawings, wherein.

Figure 1:
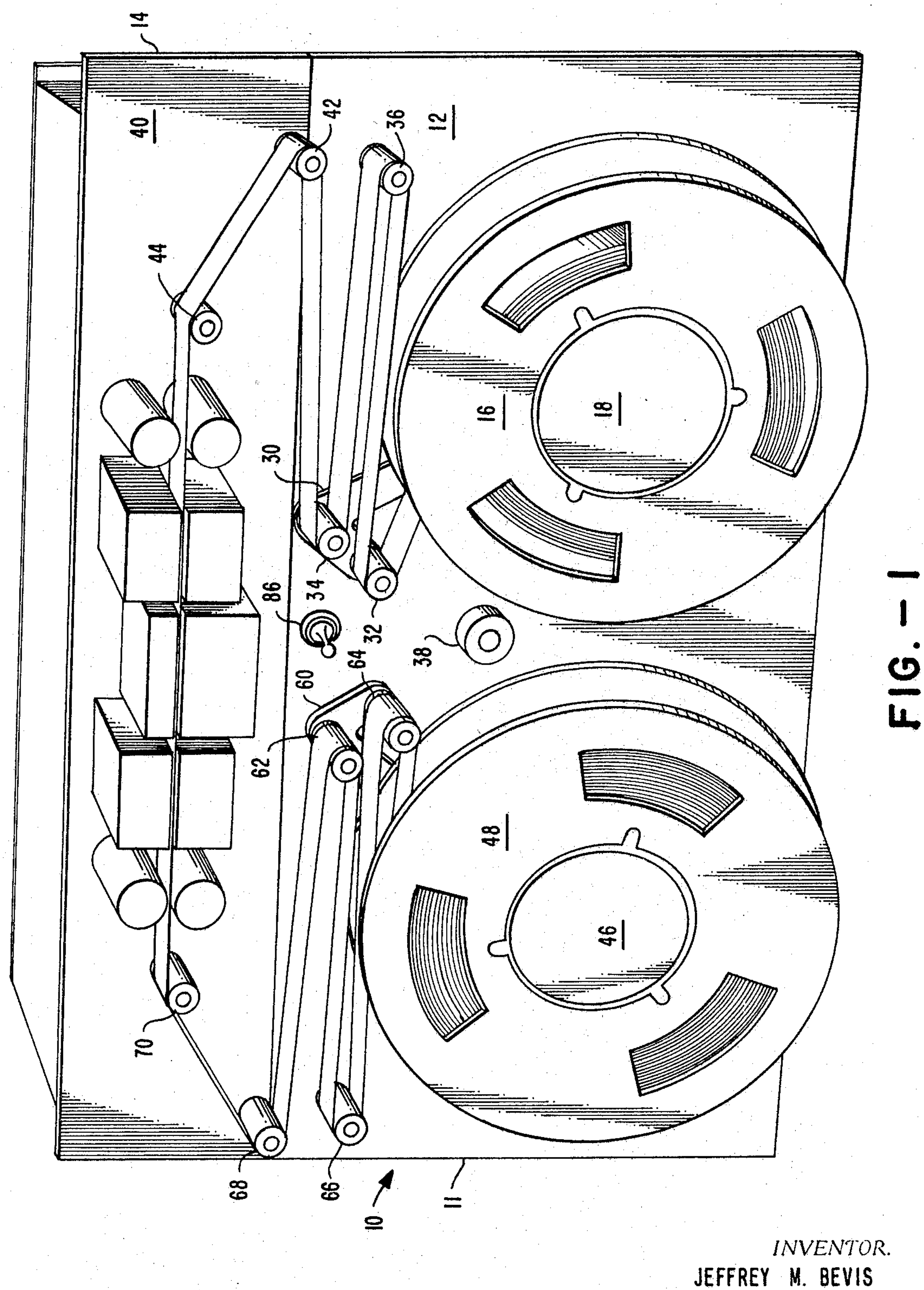
FIG. 1 is an elevational view of the tape handler constructed according to the principles of this invention, and showing the tape reader mounted thereon.

Referring now to FIG. 1 of the drawing, the tape handler indicated generally by the reference numeral 10 comprises a generally rectangular cabinet 11 with a front panel or support 12. The width of the front panel is the same as the width of the perforated tape reader 14 and in assembled relation the tape reader is mounted on the tape handler as shown in FIG. 1 of the drawing. The tape handler consists of two identical tape reel systems (one is left-handed) for storing, paying out, or taking up tape. These systems share a common power supply and certain control functions.

Figure 2:
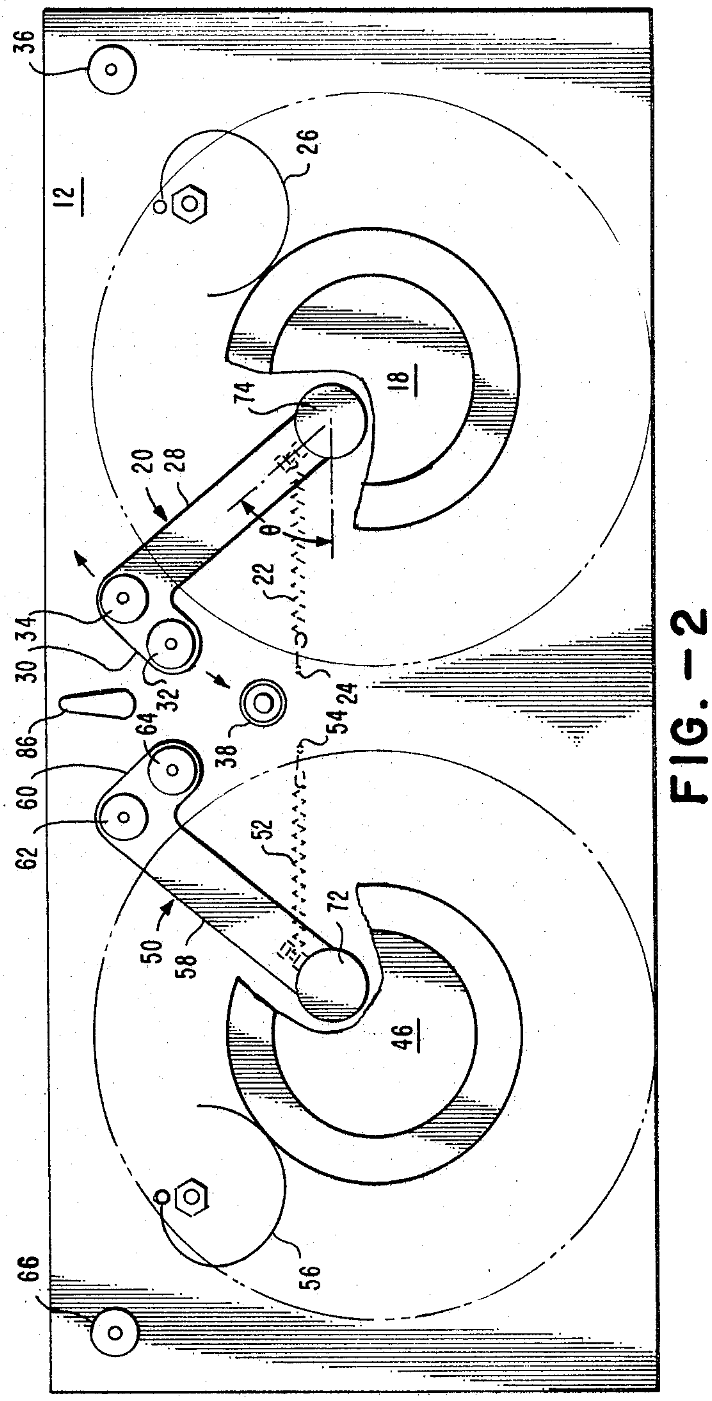
FIG. 2 is an elevational view of the tape handler with the tape reels removed.

The right hand tape reel system comprises a removably mounted tape reel 16 mounted on a rotatable motor driven shaft 18. A pivotally mounted generally L-shaped low inertia take-up arm 20 is associated with tape reel 16, see FIG. 2. A coil spring 22 is connected between the take-up arm 20 and a suitable fixed pin 24 on the front panel 12. This spring biases the take-up arm in a counter-clockwise direction as shown in FIG. 2. In addition, a heavy arcuate spring blade 26 is mounted on the front panel 12 in position to be engaged by the leg 28 of the L-shaped take-up arm 20 when the arm pivots through a large enough angle.

The foot 30 of the L-shaped take-up arm 20 is provided with two rollers or idler spools 32 and 34 disposed in spaced relation to each other. A tape guide roller 36 is mounted on the front panel 12 near the right hand edge for reasons to be described below. The knob 38 of a power control switch (not shown) is positioned in the center of the front panel in the path of the foot 30 of the take-up arm so that when the take-up arm pivots sufficiently the foot 30 will kick or strike the knob 38 and thereby actuate the switch to shut off power to the tape handler 10 and the tape reader 14.

The tape reader 14 is provided with a front panel 40. Idler rollers 42 and 44 are rotatably mounted on a front panel 40 to cooperate with the idler rollers 36 and the idler spools 32 and 34 in establishing a long tape path between the tape reader 14 and the tape handler 10. This long tape path when combined with the low inertia take-up arms permits the tape handler to accommodate very high speed tape accelerations and decelerations and wind the tape up on the tape reels.

A DC high-speed low inertia motor (not shown) is mounted in cabinet 11 and is connected to shaft 18 of reel 16 through a suitable speed reduction mechanism. The motor is capable of rotation in either direction and at high acceleration.

An identical tape reel system is mounted on the left side of the tape handler, see FIG. 1. This tape system comprises an identical DC motor driving a shaft 46 on which a tape reel 48 is mounted. A pivotally mounted generally L-shaped low inertia take-up arm 50 is associated with tape reel 48, see FIG. 2. A coil spring 52 is connected between the take-up arm 50 and a suitable fixed anchor pin 54 on the front panel 12. This coil spring biases the take-up arm in a clockwise direction, see FIG. 2. In addition, a heavy arcuate spring blade 56 is mounted on the front panel in position to be engaged by the leg 58 of the L-shaped take-up arm 20.

The foot 60 of the L-shaped arm 50 is provided with two rollers or idler spools 62 and 64 disposed in spaced relation. A tape guide roller 66 is mounted on the front panel 12 near the left-hand edge of the panel for reasons to be described below. In addition, idler rollers 68 and 70 are rotatably mounted on the left-hand portion of the front panel 40 of the tape reader to cooperate with idler rollers 62, 64 and 66 in establishing a long tape path between the tape reader 14 and the tape handler 10 for reasons described above.

The take-up arms 20 and 50 are mounted on pivot shafts 72 and 74. The rotating sliders of potentiometers 76 and 78 are connected to shafts 72 and 74 respectively. These potentiometers are each in a feed-back circuit to be described below and they produce an electrical output corresponding to the angular position of the take-up arms. Signals from the potentiometers are fed to two operational amplifiers which use a common power supply.

Figure 3:
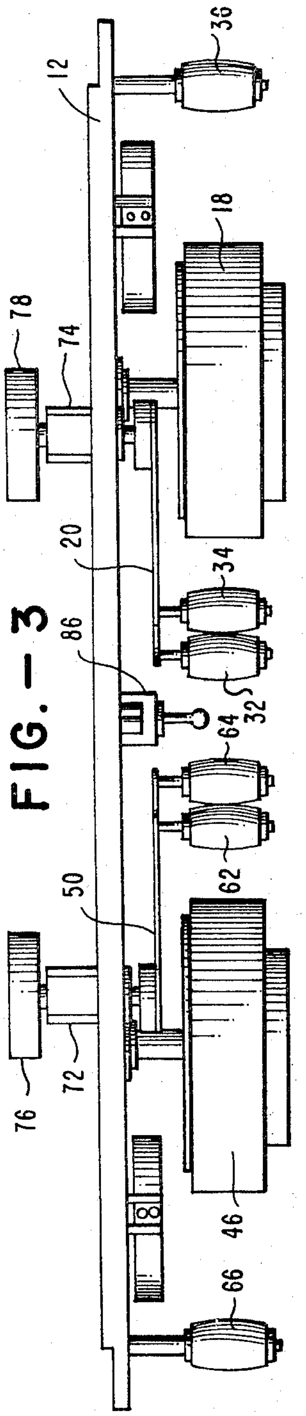
FIG. 3 is a plan view of the tape handler shown in FIG. 2.
Figure 4:
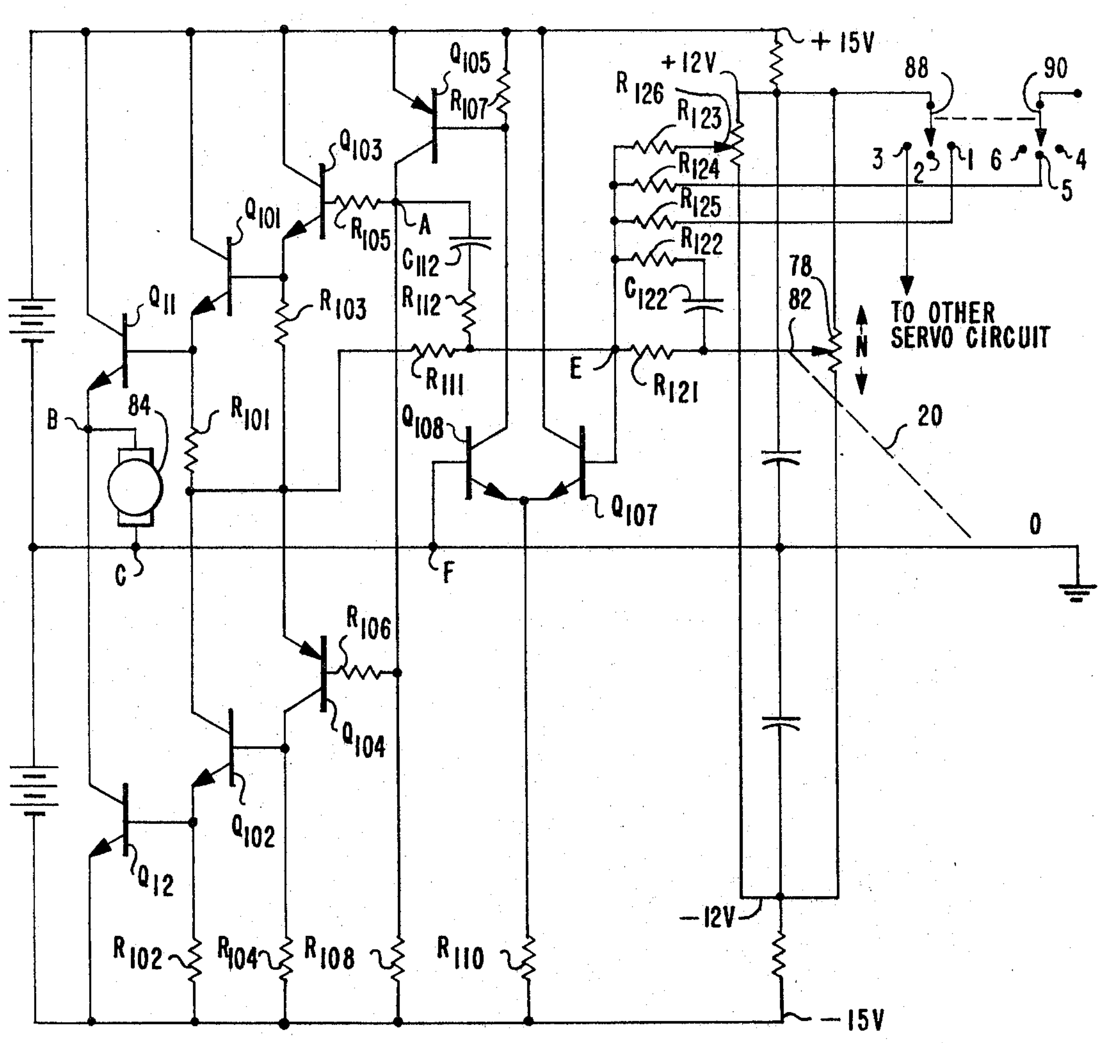
FIG. 4 is a circuit diagram showing the feedback control between the take-up arm controlled potentiometer and the motor which drives the tape reel.

As shown in FIGS. 2, 3 and 4, take-up arm 20 rotates the slider of potentiometer 78. Potentiometer 78 is in a servo-motor control circuit 80, see FIG. 4, and potentiometer 76 is in another identical servo-motor control circuit (not shown). A high speed low inertia permanent magnet DC motor 84 is controlled by servo-motor control circuit 80 and an identical motor is controlled by the other servo-motor control circuit. These motors are capable of rotating in either direction at high speeds. Motor 84 drives tape reel 16 through a suitable speed reduction mechanism and the other motor drives tape reel 48 through an identical speed reduction mechanism.

The operation of the servo-motor control circuit can best be understood by reference to FIG. 4. There it can be seen that take-up arm 20 is mechanically connected to the slider 82 of potentiometer 78. In the drawings, the slider is at a neutral position N. Since the opposite ends of the potentiometer are at +12 volts and −12 volts respectively, at the neutral position, which is at the midpoint of the potentiometer, the slider 82 will be at a potential which is midway between the potentials at the ends of the potentiometer at zero potential. With slider 82 at zero potential the base of the NPN transistor $Q_{107}$ is at zero potential. The base of the identical NPN transistor $Q_{108}$ is connected directly to ground line 84 at zero potential. Under these conditions, the same current will flow through transistors $Q_{107}$ and $Q_{108}$.

The current flow through transistor $Q_{108}$ drops the potential across $R_{107}$ and lowers the potential on the base of the PNP transistor $Q_{105}$, causing it to become more conductive. Transistors $Q_{107}$, $Q_{108}$, and resistor $R_{107}$ are selected so under these conditions the collector of transistor $Q_{105}$ at terminal A is approximately at zero potential. Consequently, the base of the NPN transistor $Q_{103}$ and the PNP transistor $Q_{104}$ will be at zero potential.

When the bases of transistors $Q_{103}$ and $Q_{104}$ are at zero potential, the emitters of transistors $Q_{103}$ and $Q_{104}$ will also be approximately at zero potential.

With the emitters of NPN transistor $Q_{103}$ and PNP transistor $Q_{104}$ at zero potential, transistors $Q_{101}$ and $Q_{102}$ are off, and so identical NPN transistors $Q_{11}$ and $Q_{12}$ will be off or non-conductive. With this arrangement the emitter of transistor $Q_{11}$ at terminal B will be midway between +15 volts and −15 volts, and so will be at zero potential. Since terminal C is also at zero potential, the motor will not operate.

If a signal is put into transistor $Q_{107}$ by moving the take-up arm 20 (which in practice can be caused by high speed tape accelerations and decelerations) and depending on the direction of movement of the slider 82, the potential on the base of transistor $Q_{107}$ may, for example, decrease. This will further decrease the conductivity of transistor $Q_{107}$. This in turn causes a corresponding increase in the conductivity of transistor $Q_{108}$ so that the voltage drop across the resistor $R_{107}$ increases. This causes a decrease in the potential on the base of PNP transistor $Q_{105}$.

The decrease of potential on the base of transistor $Q_{105}$ increases the conductivity of the transistor so that the potential on the collector of transistor $Q_{105}$ (terminal A) rises. This increases the potential on the base of the NPN transistor $Q_{103}$ making it more conductive.

The effect increases the voltage drop across resistor $R_{103}$ so that the base of the NPN transistor $Q_{101}$ rises making transistor $Q_{101}$ more conductive. This increases the potential on the base of the NPN transistor $Q_{11}$ causing the potential on the emitter (terminal B) of the transistor $Q_{11}$ to rise above the ground or zero potential so that a voltage appears across motor 84 causing it to rotate and causing tape reel 16 to rotate.

The direction of rotation of the tape reel 16 is such as to exert tension on the tape connecting the tape reel 16 and the tape arm 20 in a direction which restores the take-up arm back to its first fixed angular or neutral position with slider 82 back at its neutral position N. When this happens the motor stops.

If the take-up arm 20 was initially displaced in the opposite direction, the same analysis of circuit 80 would show that the motor 84 rotates in the opposite direction causing tape reel 16 to also rotate in the opposite direction which would also have the effect of restoring the take-up arm 20 back to its first neutral position.

As shown in FIGS. 1, 2 and 4 a tape wind switch 86 is provided. The tape wind switch comprises two sliders 88 and 90 which are mechanically connected together. When sliders 88 and 90 are connected to the terminals 2 and 5 as shown, the circuit operates as described above. When, however, the sliders are connected to terminals 1 and 4 respectively it can be seen that 12 volts are connected through the resistance $R_{125}$ to the base of transistor $Q_{107}$. This makes transistor $Q_{107}$ more conductive and following the analysis of circuit 80 described above, it causes transistor $Q_{105}$ to become less conductive.

This increases the conductivity of PNP transistor $Q_{104}$ which in turn causes transistor $Q_{102}$ to become more conductive. Consequently, transistor $Q_{12}$ becomes more conductive, which pulls the potential of terminal B below terminal A to start motor 84 and to cause tape reel 16 to rotate.

Under these conditions, and with the tape reel 16 connected to the take-up arm 20 by the perforated tape as shown in FIG. 1, the rotation of the tape reel 16 pulls the take-up arm 20 and slider 82 to a second fixed angular or neutral position. In this position, the slider counteracts the 12 volt input by the wind switch 86. When the take-up arm 20 reaches this second neutral position the motor again stops rotating.

As shown in FIG. 1 the perforated tape moving through the tape reader 14 is connected to both take-up arms 20 and 50 and the tape reels 16 and 48. The motors driving the tape reels are connected so they rotate in a direction which tends to increase tape tension. Furthermore, as can be seen by a study of FIG. 4, motor 84 will rotate as long as terminals E and F in the differential or operational amplifier are at different potentials and the direction of rotation of the motor depends on whether terminal E is at a higher or lower potential than terminal F.

To summarize the operation of the tape wind switch 86, when sliders 88 and 90 are connected to terminals 1 and 4 respectively, the potential at terminal E rises above the potential at terminal F which makes the motor 84 run and which through the connection between the rotating tape reel 16 and the take-up arm 20 causes the take-up arm 20 to pivot in a direction which causes slider 82 to pull the potential at terminal E back to the potential at terminal F thereby causing the motor to stop. It is noted that this effect can only occur when the magnetic brakes of the tape reader are on and the movement of the take-up arm to the second neutral position increases the tension in the tape.

When the magnetic brakes are off, the tension in both tape reel systems is unbalanced causing the tape to move in the direction of the greatest tension. With this arrangement, the motors will continue to operate and this provides the tape handler with a rapid wind.

It is understood, of course, when sliders 88 and 90 are connected to terminals 3 and 6 respectively, the servomotor control circuit associated with tape reel 48 is actuated, causing tape reel 48 to rapidly wind up tape.

Provision is made for remote operation of the tape handler. When sliders 86 and 88 are connected to terminals 5 and 2 a signal from a remote point, controlled for example by the perforated tape reader, can supply a suitable signal voltage to the base of transistor $Q_{107}$ over resistor $R_{124}$ to cause the motor 84 to drive arm 20.

Furthermore, since, as explained above, the two handlers provide an independent power wind up of the tape reels, advantage can be taken of the remote control operation of the tape handler to drive the tape through the tape reader by means of the motor driven tape reels of the tape handler thereby eliminating the need for pinch rollers and capstans in the tape reader. This arrangement could be useful when the length of the tape to be fed through the tape reader is very long.

In normal operation a potentiometer $R_{126}$ is provided to adjust the first neutral position of arm 20 to the center of the travel range where the force exerted by spring 22 is low.

To recapitulate, the differential or operational amplifier comprising transistors $Q_{107}$ and $Q_{108}$ and resistors $R_{123}$, $R_{124}$, $R_{125}$, $R_{122}$ and potentiometer 78 operate to maintain a zero voltage at the summing point which is the base of transistor $Q_{107}$. In the quiescent or first neutral position the output voltage is zero and there is no current to the feedback resistors $R_{111}$ and $R_{112}$. The current through $R_{121}$ from the potentiometer 78 must equal the current through resistor $R_{123}$ from the zero adjust potentiometer $R_{126}$.

Normally the potentiometers 78 and $R_{126}$ in the servocontrol circuit 80 produce a zero output. However, if one is set above its midpoint, the other may be set below its center by an amount which will produce a compensating current. Thus, as stated above, potentiometer 126 may be used to establish any desired quiescent or first neutral position for the take-up arm 20. Similarly, when either of the special inputs through $R_{124}$ and $R_{125}$ is used, the effect is to shift the quiescent point of the take-up arm 20.

Whenever the take-up arm 20 is not at its quiescent or first neutral position, an error voltage is produced at the base of $Q_{107}$ (the summing point). This error voltage is amplified by the amplifier and appears as an output voltage at the emitter of transistor $Q_{11}$. The feedback path through $R_{111}$ tends to produce a voltage of opposite polarity at the base of $Q_{107}$ compensating for the original error. The effect of the feedback is to make the operational amplifier output a function of the input only and not a function of the amplifier gain characteristics.

As explained above, the amplifier output is fed to motor 84 which will move the tape, and this moves the take-up arm back to its quiescent point. The above-described closed loop system causes the motor to run in the direction and at the proper speed to maintain the arm at its first neutral position and hence to maintain a constant tension on the tape in response to the operation of the tape reader.

As described above, proper operation of the tape handler requires careful regulation of the tape tension. If the tape tension is too low, the tape will fall off the pulleys or idler spools and the tape reel will wind so loosely that the tape reel cannot hold enough tape. If the tape tension is too high, the tape will break, particularly since at various portions of the tape the perforations in the tape weaken it.

The tape reader 14 is provided with a pinch roller and capstan which drives the tape through the tape reader in a manner well known in the art. As the tape passes through the tape reader, it affects the tension in the tape which causes the low inertia take-up arm to move, which as explained above, causes the tape reel to rotate in a direction to restore the tape tension and the take-up arm to its first neutral position. Consequently, the tape reels in the handler follow the movement of the perforated tape as controlled by the tape reader 14. During tape wind up the motor 84 provides power for driving the tape reels to wind up the tape.

Referring to FIGS. 1 and 2 of the drawing, the path length of the tape between the tape reader 14 and the tape readers 16 and 48 plus the pivotal mounting arrangement of the low inertia take-up arms 20 and 50 permit the tape handler to accommodate high speed stops and starts without tearing the tape and providing a tight tape wind on the tape reels. Furthermore, the angular position of the take-up arms controls the tension in the tape.

Figure 5:
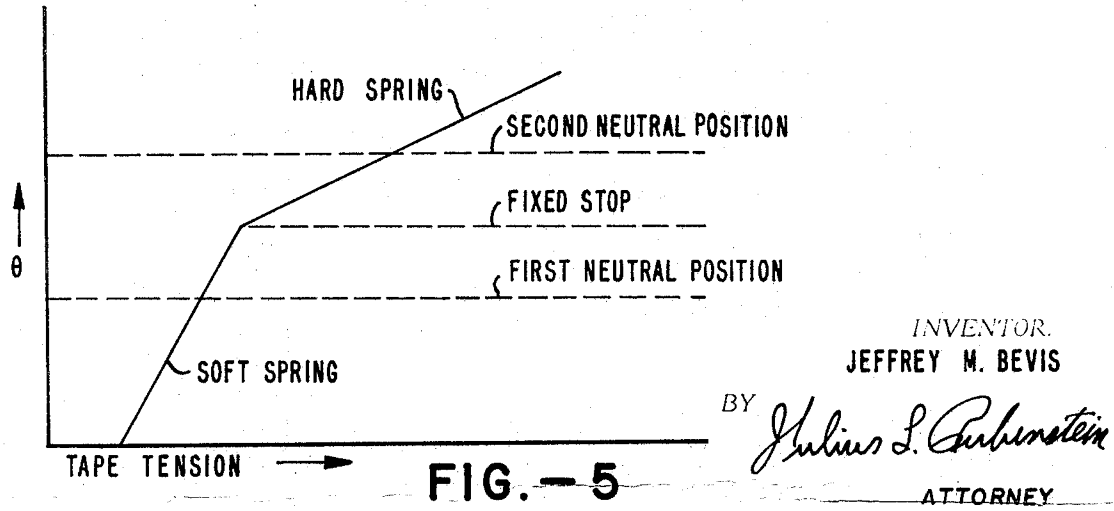
FIG. 5 is a diagrammatic view showing the relationship between the angular position of the take-up arms as a function of the tape tension.

As best seen in FIG. 2 weak coil spring 22 opposes the pull on the take-up arm 20 exerted by the tape reels winding up the tape. Consequently, as can be seen in FIG. 5, the tension on the tape does not vary much with increasing angle until the take-up arm 20 pivots into engagement with the strong arcuate leaf springs 26. Since the action of motor 84 in driving the tape reel 16 is to cause the take-up arm to pivot in response to the pull on the tape by the tape reel, when the take-up arm 20 strikes the strong leaf spring 26 the tension required to further pivot the arm increases sharply. This can be seen by reference to FIG. 5. When the tape handler is merely operating to store the tape, the first neutral position for the take-up arms occurs before the arm strikes the spring 26. The second neutral position is located at an angular position slightly beyond where the take-up arm first strikes spring 26 so that spring 26 must be compressed somewhat to permit the take-up arm to pivot to its second neutral position. To do this, however, the tape tension must be substantially increased in order to permit the take-up arm 20 to pivot to its second neutral position and this increased tape tension is used for rapid wind or rewind in the manner described above.

The importance of the spring 26 can be illustrated by imagining that instead of a strong spring, a fixed stop were positioned just before the arm pivots to its second neutral position. In such an event the tension on the tape would be indeterminate since after the take-up arm strikes a fixed stop, no amount of tape tension would increase the angular position of the take-up arm. In addition, a controlled tape tension could not be achieved during tape rewind. With the arrangement shown in the drawings, every angular position of the take-up arm corresponds to a unique tape tension. Hence, by providing the control circuit described above, wherein one neutral position for the take-up arm is provided during normal tape feed and winding operations and another neutral position for the take-up arm is provided for rapid rewind, a controlled tape tension is maintained for all operations of the tape handler.

I claim:

1. A tape handler of the class described comprising a support, two tape reels mounted on the support, means connected to each tape reel for rotating the tape reel in a forward or reverse direction, said tape handler adapted to be connected to a tape reader whereby tape from the tape reader extends from one tape reel through the tape reader to the other tape reel, and a low inertia pivotally mounted take up arm associated with each tape reel, each take-up arm having tape engaging means thereon for engaging tape passing from the tape reader to the tape reel whereby the path length of the tape extending between the tape reader and the tape reel over said tape engaging means depends on the angular position of the take-up arms and is long enough to provide a sufficient slack for high speed tape acceleration and deceleration, means biasing each take-up arm in a pivotal direction in such a way that the tension in the tape is a continuous function of the angular position of the take-up arms, and a feedback servo-circuit connected to said means for rotating said tape reels for controlling said means so the tape reels rotate in a direction which restores said take up arms to a fixed angular position during high speed tape accelerations and decelerations whereby the tension in the tape is maintained generally constant while the tape reels pay out or take up tape passing through the tape reader and a two stable position power control switch, said power control switch having an actuator positioned between said take up arms in position to be struck by the take up arms to actuate the power control switch when the tape breaks or falls off the tape engaging means on the take up arms to turn the power control switch to its stable power off position whereby power to the tape handler and tape reader is cut off until the actuator is manually reset to its stable power on position.

2. A tape handler of the class described comprising a support, two tape reels rotatably mounted on the support, means connected to each tape reel for rotating each tape reel in a forward or reverse direction, said tape handler adapted to be connected to a tape reader whereby tape from the tape reader extends from one tape reel through the tape reader to the other tape reel, and a low inertia pivotally mounted take-up arm associated with each tape reel, each take-up arm having tape engaging means thereon for engaging tape passing from the tape reader to the tape reel whereby the path length of the tape extending between the tape reader and the tape reel over said tape engaging means depends on the angular position of the take-up arms, a first weak spring connected between each take-up arm and the support for biasing each take-up arm in a pivotal direction such that the tension in the tape is a continuous function of the angular position of the take-up arms, a second strong spring positioned to engage the take-up arms after it rotates through a predetermined angle to provide substantially increased tension in the tape after the take-up arm engages said second spring, and a feedback servo-circuit connected to said means for rotating said tape reels for controlling said means so the tape reels rotate in a direction which restores said take-up arms to a first fixed angular position during high speed tape accelerations and decelerations whereby when the tape handler is following the commands of the tape reader the tension in the tape is maintained substantially constant while the tape reels pay out or take up tape passing through the tape reader, said feedback servo-circuit having signal input means for controlling said circuit so said means for rotating said tape reels rotates the tape reels so they cause said take-up arms to rotate to a second fixed angular position beyond the point of engagement between said second strong spring and the take-up arm whereby the compression of said second spring causes the tension in the portion of the tape between the take-up arm in the second fixed angular position and the associated tape reel to be substantially increased in comparison to the tension in the tape between the other take-up arm in the first angular position and its associated tape reel whereby the tape will move to and wind on the tape reel exerting the strongest tension for rapid rewind while the fixed angular position of the arm in the second fixed angular position maintains a constant controlled tension in the tape during rewind.

3. The tape handler described in claim 2 including the actuator of a power control switch, said actuator positioned between said tape-up arms in position to be struck by the take-up arms to actuate said power control switch when the tape breaks or falls off the tape engaging means on the take-up arms whereby power to the tape handler and the tape reader is cut off.

4. The tape handler described in claim 2 wherein said servo-circuit is provided with input means to provide remote control of the tape handler when a signal is fed into said input means.

5. A tape handler of the class described comprising a support, two tape reels rotatably mounted on the support, an electric motor connected to each tape reel to drive each tape reel in a reversible direction, said tape handler adapted to be connected to a tape reader whereby tape from the tape reader extends from one tape reel through the tape reader to the other tape reel, a low inertia pivotally mounted take-up arm associated with each tape reel and mounted on a pivot shaft on said support, each take-up arm having two spaced idler rollers mounted thereon, additional idler rollers mounted on the support for engaging the tape passing from the tape reader over all said idler rollers to the tape reel and providing a very long path length for the tape from the tape reader to the tape reels whereby slack is provided for high speed tape accelerations and decelerations, said tape passing over said idler rollers to said tape reels providing a mechanical connection between said take-up arms and said tape reels, a first weak spring connected between each take-up arm and the support for biasing each tape-up arm in one direction whereby the tension in the tape passing over said idler rollers to said tape reels is a function of the angular position of the take-up arms, a second strong spring positioned to engage the take-up arms after it rotates through a pre-determined angle to provide a substantially increased tension in the tape passing over the idler rollers on the take-up arm that engages and compresses said second spring, the pivot shaft of each take-up arm connected to the slider of a potentiometer, each potentiometer in a feedback servo-circuit, each feedback servo-circuit connected to and controlling one of said electric motors and the connected tape reel and thereby controlling the angular position of said take-up arms when tape is connected between the take-up arms and the tape reels whereby the tape reels in paying out or taking up tape rotate in a direction which restores the associated take-up arm to a first fixed angular position whereby the tension in the tape is maintained generally constant during high speed tape accelerations and decelerations while the tape handler follows the commands of the tape reader, said feedback servo-circuit having signal input means for affecting said circuit so that when a signal is fed into the circuit the motors rotate in a direction which when tape is passing from the take-up arm to the tape reels causes the rotation of the tape reels to pivot the take-up arm to a second fixed angular position before the motor stops operating, said second fixed angular position beyond the point of engagement between said take-up arm and the second strong spring whereby the compression of said second spring causes the tension in the portion of the tape between the take-up arm in the second fixed position and the associated tape reel to be substantially increased in comparison to the tension in the tape between the other take-up arm in the first angular position and the associated tape reel whereby the tape will move to and wind up on the tape reel exerting the strongest tension for rapid winding while maintaining a controlled tension in the tape during rewind.

6. The tape handler described in claim 5 including the actuator of a power control switch, said actuator positioned between said take-up arms in position to be struck by the take-up arms to actuate said power control switch when the tape breaks or falls off the idler rollers on the take-up arms whereby power to the tape handler and the tape reader is cut off.

References Cited

UNITED STATES PATENTS

| | | | |
|---|---|---|---|
| 2,985,396 | 5/1961 | Johnson | 242—55.12 |
| 3,022,960 | 2/1962 | Foster | 242—75.3 |
| 3,135,476 | 6/1964 | Gooch | 242—55.12 |
| 3,269,670 | 8/1966 | Brian et al. | 242—55.12 |

LEONARD D. CHRISTIAN, Primary Examiner

U.S. Cl. X.R.

242—57